United States Patent
Trambley et al.

(10) Patent No.: US 7,017,788 B2
(45) Date of Patent: Mar. 28, 2006

(54) ADAPTER BRACKET FOR SECURING A SUPPORT FOOT OF A ARTICLE CARRIER SUPPORT RAIL TO AN OUTER SURFACE OF A VEHICLE HAVING A ROOF CHANNEL

(75) Inventors: Claude Trambley, Sterling Heights, MI (US); Donald R. Potter, Clarkston, MI (US)

(73) Assignee: JAC Products, Inc., Saline, MI (US)

( * ) Notice: Subject to any disclaimer, the term of this patent is extended or adjusted under 35 U.S.C. 154(b) by 195 days.

(21) Appl. No.: 10/103,037

(22) Filed: Mar. 21, 2002

(65) Prior Publication Data
US 2003/0178458 A1 Sep. 25, 2003

(51) Int. Cl.
*B60R 9/00* (2006.01)

(52) U.S. Cl. ............... 224/326; 224/556; 248/300; D8/366

(58) Field of Classification Search ......... 224/326, 224/327, 329, 924, 555, 556, 547, 325, 323, 224/324; 248/300, 505, 223.41, 225.11; 105/165, 199.5, 228, 227; 293/155; 362/421; D8/366, 354
See application file for complete search history.

(56) References Cited

U.S. PATENT DOCUMENTS

| | | | | |
|---|---|---|---|---|
| 1,441,559 A | * | 1/1923 | Reinhart | 403/205 |
| 4,097,012 A | * | 6/1978 | McIntyre | 248/674 |
| D256,663 S | * | 9/1980 | Gilb | D8/354 |
| D257,664 S | * | 12/1980 | McKee | D8/354 |
| 4,718,582 A | * | 1/1988 | Iovenitti | 224/42.21 |
| 4,823,673 A | * | 4/1989 | Downing | 89/37.04 |
| 4,993,609 A | * | 2/1991 | Flint | 224/42.2 |
| 5,417,401 A | * | 5/1995 | Thompson et al. | 248/674 |
| D363,875 S | * | 11/1995 | Korb | D8/373 |
| D371,293 S | * | 7/1996 | Schoenmeyr | D8/354 |
| 5,636,954 A | * | 6/1997 | Henderson et al. | 411/84 |
| 5,975,391 A | * | 11/1999 | Aftanas et al. | 224/309 |
| D425,403 S | * | 5/2000 | Medina | D8/354 |
| 6,061,989 A | * | 5/2000 | Trivedi et al. | 52/633 |
| 6,116,486 A | * | 9/2000 | Lindell | 224/331 |
| 6,315,489 B1 | * | 11/2001 | Watanabe | 403/381 |
| 6,751,093 B1 | * | 6/2004 | Hsu et al. | 361/685 |
| 2001/0013528 A1 | | 8/2001 | Chimenti et al. | |

FOREIGN PATENT DOCUMENTS

| | | |
|---|---|---|
| DE | 0 952 037 A2 | 10/1999 |
| DE | 1 153 797 A2 | 11/2001 |
| GB | 2 303 345 A | 2/1997 |
| GB | 2 308 110 A | 6/1997 |

* cited by examiner

*Primary Examiner*—Stephen K. Cronin
(74) *Attorney, Agent, or Firm*—Harness Dickey & Pierce P.L.C.

(57) ABSTRACT

An adapter bracket for use with a vehicle article carrier side rail to allow the side rail to be secured to channels formed in an outer body surface of the vehicle. The adapter bracket includes a channel coupling portion adapted to be secured to a bottom wall of the channel. An intermediate portion extends from the channel coupling portion to perpendicularly extending flanges of an outer surface portion. The flanges of the outer surface portion are coupled to the support foot of the side rail to allow the support foot to be mounted essentially flush against the outer body surface without the need for drilling additional holes outside of the channel. The adapter bracket thus allows a conventional elevated side rail to be quickly and easily secured to an existing channel formed in the outer body surface of a vehicle roof.

11 Claims, 3 Drawing Sheets

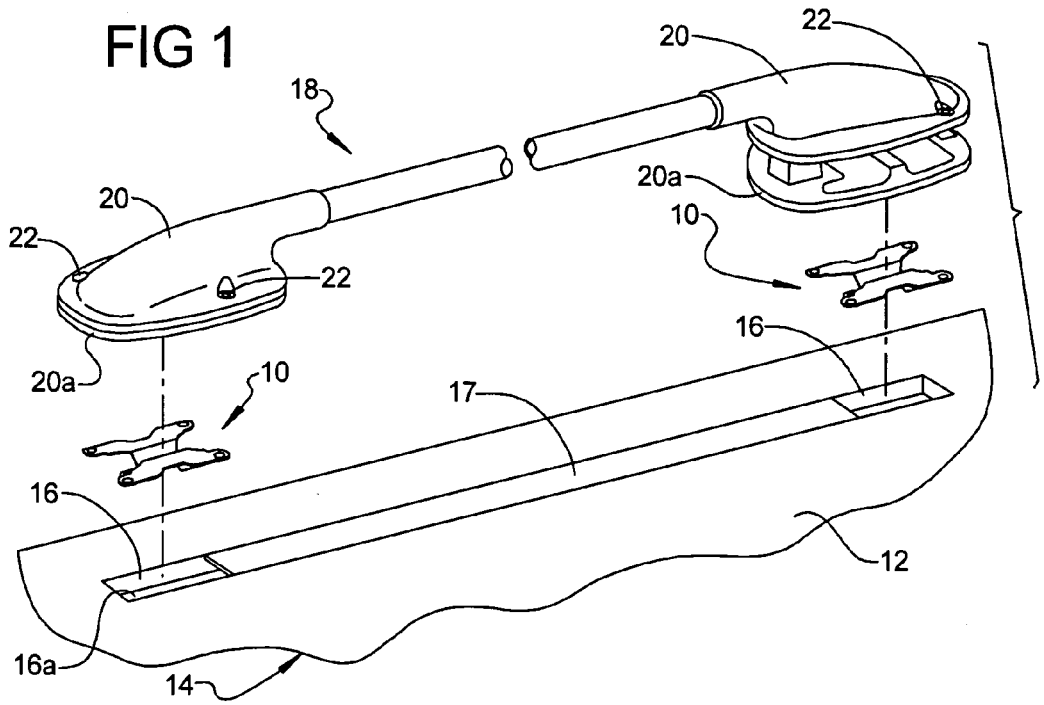
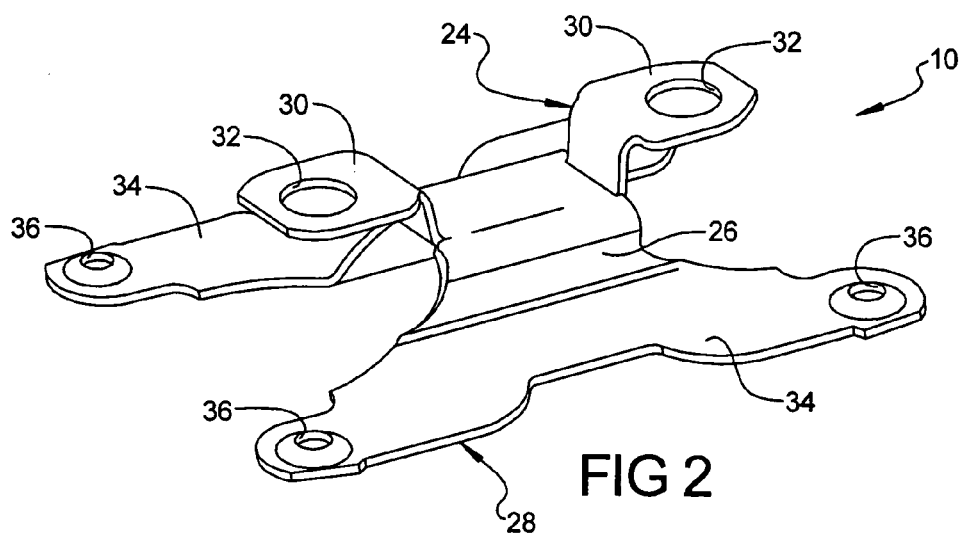

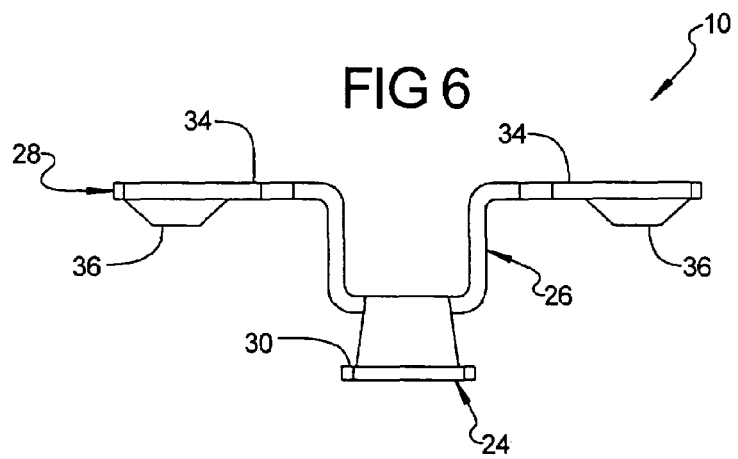
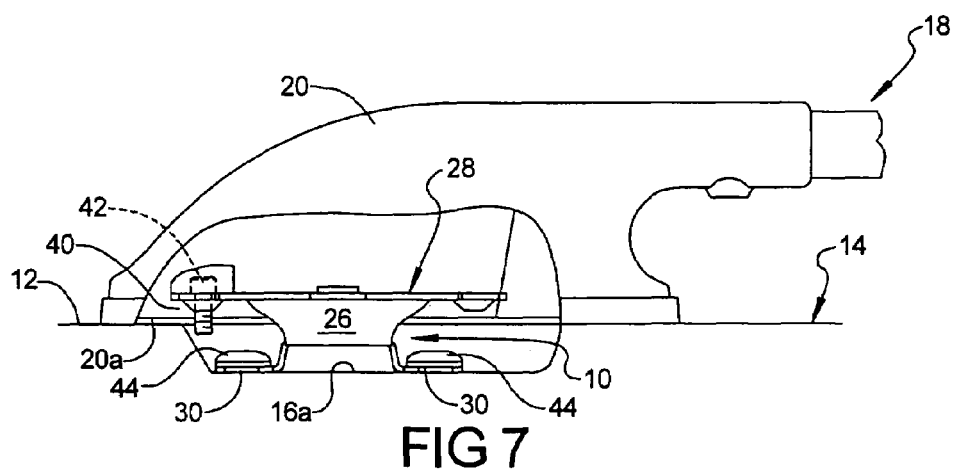

ADAPTER BRACKET FOR SECURING A SUPPORT FOOT OF A ARTICLE CARRIER SUPPORT RAIL TO AN OUTER SURFACE OF A VEHICLE HAVING A ROOF CHANNEL

FIELD OF THE INVENTION

This invention relates to vehicle article carrier systems, and more particularly to an adapter bracket for enabling a support foot of an article carrier side rail to be secured to an outer body surface of a vehicle over a roof channel formed in the outer body surface.

BACKGROUND OF THE INVENTION

Vehicle article carriers are used in a wide variety of applications to store articles above an outer body surface of a vehicle such as a car, sport utility vehicle, truck or mini van. Often, the outer body surface of the vehicle includes a pair of channels to which support slats of a vehicle article carrier can be secured. However, if a conventional elevated side rail is to be secured, it typically includes a pair of support feet at its outer most ends for holding a support rail portion above the outer body surface of the vehicle. Each of the support feet typically are secured to the outer body surface rather than to the channel. Thus, when attempting to mount the support feet, additional holes are required to be drilled in the outer body surface on both sides of the channel such that each of the support feet can be securely mounted to the outer body surface.

As will be appreciated, the need to drill additional holes into the outer body surface presents a number of undesirable consequences. The additional holes form means by which water or moisture can penetrate the outer body surface potentially causing corrosion to the outer body surface of the vehicle roof. The very act of drilling additional holes is time consuming and requires additional labor that ultimately adds to the overall cost of installing the vehicle article carrier.

Accordingly, it would be highly desirable to provide some form of adapter bracket that allows conventional support feet, which are intended to be mounted on the outer body surface, to be mounted to existing channels formed in the roof of a vehicle. In this manner, no additional holes would need to be drilled if a side rail with conventional support feet, rather than a slat, are to be mounted to the outer body surface. Such a bracket would eliminate the need to drill extra holes on opposing sides of the channels and would therefore expedite installation of the support feet as well as reduce the overall cost of assembly of the vehicle article carrier system onto the vehicle.

SUMMARY OF THE INVENTION

The present invention is directed to a support bracket which allows a conventional support foot of a vehicle article carrier to be secured to an outer body surface of a vehicle having at least one roof channel formed therein. The bracket includes a channel coupling portion which is adapted to mount in the channel in the vehicle roof with conventional fastening elements such as, for example, rivnut fasteners, conventional threaded nut and bolt fasteners or upwardly projecting threaded studs and cooperating nuts used to attach the bracket. An intermediate portion extends from the channel coupling portion to an outer surface portion of the bracket. The outer surface portion includes flanges extending on opposite sides of the channel, with each flange including at least one opening for receiving an external fastening element. The flanges are further preferably shaped so as to fit within the periphery of the support foot and allow the support foot to be connected thereto without the need for drilling or otherwise forming any holes in the outer body surface of the vehicle besides those present in the channels. Thus, the adapter bracket of the present invention allows the support feet of a conventional side rail to be secured to an outer body surface over corresponding channels formed in the outer body surface without the need for drilling or forming additional holes in the outer body surface.

In one preferred embodiment the adapter bracket is formed from a single piece of metal such as aluminum or steel. The intermediate portion forms an offset which spaces the flanges of the outer surface portion vertically above the bottom wall of the channel in the roof. In this manner, once the support foot is attached to its associated adapter bracket, the support foot will rest flush on the outer body surface of the vehicle. The bracket is therefore hidden within the structure of the support foot and the channel within which it is mounted.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a portion of a vehicle roof illustrating a pair of channels formed in the roof, with adapter brackets of the present invention and the support feet of a conventional side rail positioned over the channels ready to be mounted thereto;

FIG. 2 is an enlarged perspective view of the adapter bracket shown in FIG. 1;

FIG. 6 is a front view of the adapter bracket; and

FIG. 7 is a side view of the adapter bracket securing one support foot to the outer body surface of a vehicle.

DETAILED DESCRIPTION OF THE PREFERRED EMBODIMENTS

Figure 3:
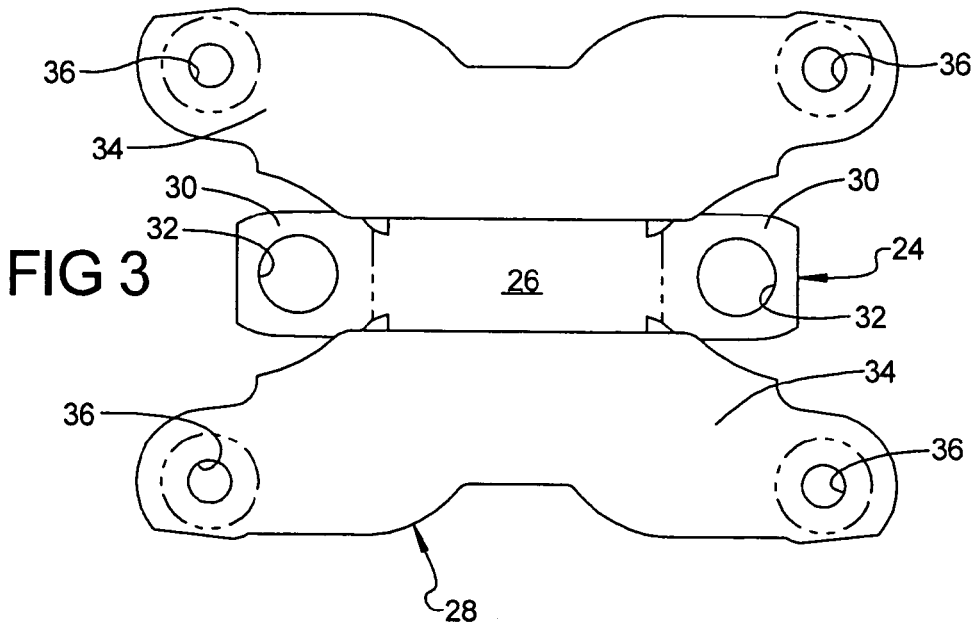
FIG. 3 is a plan view of the adapter bracket.

The following description of the preferred embodiment(s) is merely exemplary in nature and is in no way intended to limit the invention, its application, or uses.

Referring to FIG. 1, there is shown an adapter bracket 10 in accordance with a preferred embodiment of the present invention. The adapter bracket 10 is illustrated being positioned over an outer body surface 12 of a vehicle roof 14. The outer body surface 12 includes a roof ditch or channel 16 formed therein, and more preferably a plurality of such channels 16 at spaced apart locations on the roof 14. The channels are typically each covered with a weather stripping-like strip of material 17 having end sections which can be removed to expose portions of the channel 16. The exposed portions of the channels 16 are used to secure article supporting slats flush against the outer body surface 12 via suitable support brackets. However, if a conventional elevated side rail, such as a side rail assembly 18 shown in FIG. 1, is used in place of a conventional slat, then mounting of the support feet 20 at each end of the side rail 18 poses a problem. The support feet 20 typically each have a mounting pad 20a and at least a pair of spaced apart openings 22 by which fastening elements are traditionally used to secure the support feet 20 to the outer body surface 12, with the mounting pad 20a sandwiched therebetween. This has traditionally required drilling additional holes on opposite sides of the channels 16 when the elevated side rail 18 is used in place of a flush mounted article supporting slat. The adapter bracket 10 of the present invention eliminates the need to drill additional holes in the outer body surface 12.

Figure 4:
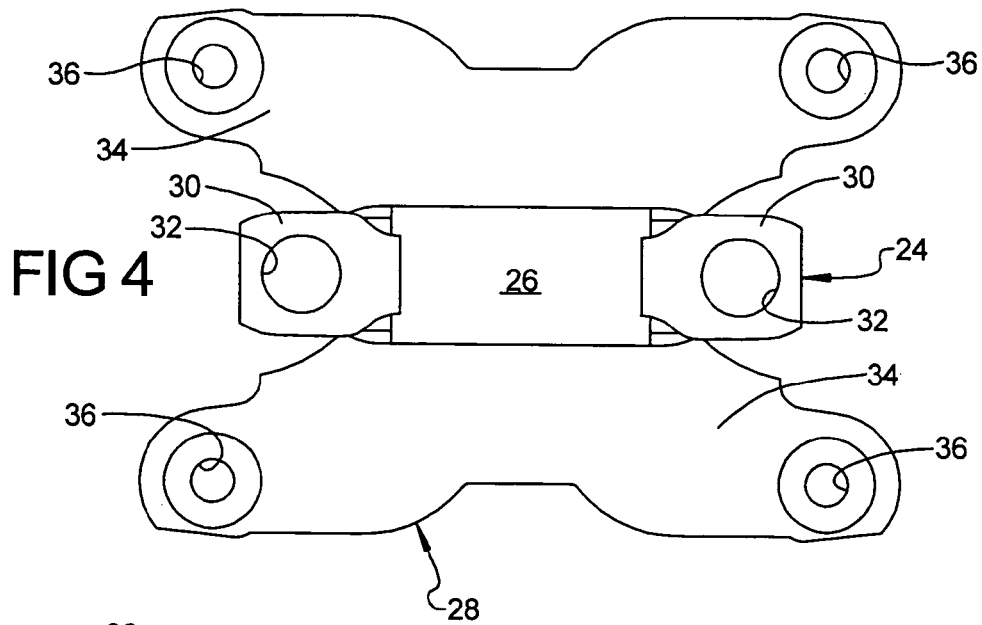
FIG. 4 is a bottom view of the adapter bracket.
Figure 5:
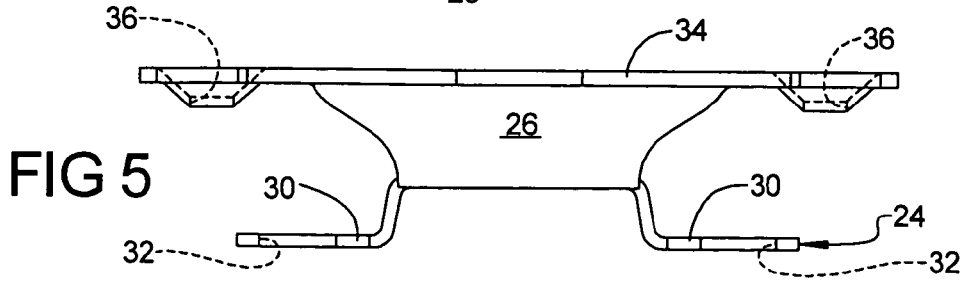
FIG. 5 is a side view of the adapter bracket.

With reference to FIGS. 2–6, the adapter bracket 10 can be seen to include a coupling portion 24, an intermediate portion 26 and an outer surface portion 28. The coupling portion 24 includes a pair of flanges 30 extending away from one another, with each flange 30 including an opening 32 formed therein. The intermediate portion 26 is used to space the outer surface portion 28 away from the channel coupling portion 24 a sufficient distance such that when the channel coupling portion 24 is mounted in a bottom wall 16a (FIG. 1) of one of the channels 16, the outer surface portion 28 is presented slightly above the outer body surface 12.

The intermediate portion 26 forms a generally U-shaped portion (FIG. 5) from which a pair of flanges 34 extend. Importantly, the flanges 34 extend away from the intermediate portion 26 such that they are positioned on opposite longitudinal sides of the channel 16 to which the adapter bracket 10 is to be secured. Each of the flanges 34 includes at least one, but more preferably a pair, of openings 36. Each of openings 36 are preferably threaded. The openings 36 are also matched to a predetermined hole pattern in the support foot 20. The openings 32 in the channel coupling portion 24 are formed so as to align with previously formed openings in the bottom wall 16a of the channel 16 to which the adapter bracket 10 is to be secured.

The adapter bracket 10 is preferably formed from a single piece of metal, and more preferably from a single piece of suitably strong aluminum or steel.

Referring to FIG. 7, the adapter bracket 10 can be seen secured to the roof portion 14 of a vehicle with one of the support feet 20 secured thereto. The channel coupling portion 24 rests flush against the bottom wall 16a of the channel 16 and is secured thereto by conventional fasteners 44, such as rivnut fasteners. This presents the outer surface portion 28 at a point slightly above the outer body surface 12. The support foot 20 has a recessed area 40 within which the outer surface portion 28 resides. At least one, and more preferably a pair, of the openings 36 and the flanges 34 are secured via conventional threaded fastening elements 42 which extend through the openings 22 formed in the support foot 20. Preferably, at least one fastening element 42 is secured to each flange 34, thus placing one fastening element 42 on each side of the channel 16. The mounting pad 20a is sandwiched between the peripheral edge of the support foot 20 and the outer body surface 12.

The adapter bracket 10 thus eliminates the need to drill any additional holes in the roof 14 when a conventional elevated side rail is to be secured to the outer body surface 12 of the roof in place of a flush mounted article supporting slat. This eases the installation of vehicle article carrier systems employing conventional elevated side rails, as well as eliminates the possibility of moisture entering through the additional holes in the outer body surface which would ordinarily be required with previous mounting brackets.

Those skilled in the art can now appreciate from the foregoing description that the broad teachings of the present invention can be implemented in a variety of forms. For example, with appropriate modifications the adapter bracket 10 could readily be mounted on an outer body surface rather than in a channel or roof ditch, to facilitate securing of a support foot to the outer body surface.

Therefore, while this invention has been described in connection with particular examples thereof, the true scope of the invention should not be so limited since other modifications will become apparent to the skilled practitioner upon a study of the drawings, specification and following claims.

What is claimed is:

1. An adapter bracket for securing a support foot of a vehicle article carrier to an outer body surface of a vehicle over a channel formed in said outer body surface, the adapter bracket comprising:
   a channel coupling portion having at least one opening adapted to receive a fastening element and being adapted to sit within said channel;
   an intermediate portion fixedly attached and extending from said channel coupling portion;
   an outer surface portion extending from said intermediate portion, said intermediate portion having a height sufficient to allow said channel coupling portion to rest in said channel while said outer surface portion rests adjacent said outer body surface;
   said outer surface portion having a pair of flanges each having at least one opening, and each extending generally parallel with said channel coupling portion and generally co-planar with said outer body portion, said outer surface portion adapted to enable a fastening element to secure said support foot to said outer surface portion; and
   wherein said intermediate portion comprises a U-shaped portion.

2. The adapter bracket of claim 1, wherein said channel coupling portion comprises a pair of spaced apart openings.

3. The adapter bracket of claim 1, wherein said flanges of said outer surface portion each have at least one opening for allowing coupling of said support foot thereto.

4. The adapter bracket of claim 3, wherein each said flange comprises a pair of spaced apart openings for allowing coupling of said support foot thereto.

5. The adapter bracket of claim 4, wherein each of said spaced apart openings comprises a threaded opening adapted to receive an external threaded fastening element.

6. An adapter bracket for securing a support foot of a vehicle article carrier to an outer body surface of a vehicle over a channel formed in said outer body, the adapter bracket comprising:
   a channel coupling portion having at least one flange, said flange including at least one opening adapted to receive a fastening element and being adapted to sit within said channel;
   an intermediate portion fixedly attached and extending perpendicularly from said channel coupling portion;
   an outer surface portion extending from said intermediate portion, said intermediate portion having a height sufficient to allow said channel coupling portion to rest in said channel while said outer surface portion rests adjacent said outer body surface; and
   said outer surface portion having a pair of flange portions extending in opposite directions away from said intermediate portion and generally co-planar with said flange of said channel coupling portion, said flange portions each having at least one opening adapted to enable a fastening element to secure said support foot to said flange portions.

7. The adapter bracket of claim 6, wherein said intermediate portion generally comprises a U-shaped portion.

8. The adapter bracket of claim 6, wherein said channel coupling portion comprises an inverted U-shaped section extending from said intermediate portion.

9. The adapter bracket of claim 6, wherein said adapter bracket comprises a single piece of metal.

10. An adapter bracket for securing a support foot of a vehicle article carrier to an outer body surface of a vehicle over a channel formed in said outer body, the adapter bracket comprising:

a channel coupling portion having a pair of flanges separated by an inverted U-shaped section, said flanges each including an opening adapted to receive a first fastening element and being adapted to aft within said channel such that said adapter bracket is securable within said channel by said first fastening elements;

an intermediate portion generally of a U-shape, fixedly attached and, extending perpendicularly from said channel coupling portion;

an outer surface portion including a pair of outer surface flanges extending from said intermediate portion away from one another, said outer surface flanges each having a pair of spaced apart threaded apertures, said U-shaped intermediate portion having a height sufficient to allow said coupling portion to rest in said channel while said outer surface flanges are positioned adjacent said outer body surface and generally coplanar with said outer body surface portion; and said outer surface flanges each being adapted to receive a plurality of second fastening elements in said threaded apertures to enable said support foot to be secured to said outer surface flanges.

11. The adapter bracket of claim 10, wherein said adapter bracket is formed from a single place of metal.

* * * * *

UNITED STATES PATENT AND TRADEMARK OFFICE
CERTIFICATE OF CORRECTION

PATENT NO. : 7,017,788 B2 Page 1 of 1
APPLICATION NO. : 10/103037
DATED : March 28, 2006
INVENTOR(S) : Trambley, Claude It is certified that error appears in the above-identified patent and that said Letters Patent is hereby corrected as shown below:

Column 5, line 18, Claim 10 (Amendment dated July 27, 2005, page 5, line 3, Claim 11), "aft" should be --sit--.

Signed and Sealed this

Eighteenth Day of July, 2006

JON W. DUDAS
*Director of the United States Patent and Trademark Office*